US010276091B2

(12) United States Patent
Yoo et al.

(10) Patent No.: US 10,276,091 B2
(45) Date of Patent: Apr. 30, 2019

(54) ORGANIC LIGHT EMITTING DISPLAY DEVICE AND HEAD MOUNTED DISPLAY SYSTEM HAVING THE SAME

(71) Applicant: Samsung Display Co., Ltd., Yongin-si, Gyeonggi-do (KR)

(72) Inventors: Young-Wook Yoo, Suwon-si (KR); Jae-Keun Lim, Suwon-si (KR); Jin-Woo Noh, Hwaseong-si (KR); Ji-Eun Park, Hwaseong-si (KR); Sung-Jin Choi, Hwaseong-si (KR); Hassan Kamal, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/648,775

(22) Filed: Jul. 13, 2017

(65) Prior Publication Data

US 2018/0018917 A1 Jan. 18, 2018

(30) Foreign Application Priority Data

Jul. 15, 2016 (KR) ........................ 10-2016-0090145

(51) Int. Cl.
*G02B 27/01* (2006.01)
*G09G 3/3225* (2016.01)
(Continued)

(52) U.S. Cl.
CPC ........... *G09G 3/3225* (2013.01); *G06F 3/013* (2013.01); *G06K 9/0061* (2013.01); *G06K 9/00604* (2013.01); *G09G 3/3266* (2013.01); *G09G 3/3275* (2013.01); *G02B 27/0093* (2013.01); *G02B 27/017* (2013.01);
(Continued)

(58) Field of Classification Search
CPC .............. G02B 27/017; G02B 27/0093; G02B 2027/0138; G02B 2027/014; G02B 2027/0178; G02B 2027/0187; G06F 3/013; G06K 9/00604; G06K 9/0061; G09G 3/3225; G09G 3/3266; G09G 3/3275;
(Continued)

(56) References Cited

U.S. PATENT DOCUMENTS 5,659,327 A * 8/1997 Furness, III ........... G02B 26/10 345/8
6,177,952 B1 * 1/2001 Tabata ................. G02B 27/017 348/47
(Continued)

FOREIGN PATENT DOCUMENTS

KR 10-2016-0022924 A 3/2016

*Primary Examiner* — Michael J Eurice
(74) *Attorney, Agent, or Firm* — Innovation Counsel LLP

(57) ABSTRACT

A head mounted display system includes an infrared sensor generating an infrared image, an image processor measuring a position of a user pupil based on the infrared image and generating image source based on the position of the user pupil, and an organic light emitting display device displaying an image corresponding to the image source. The organic light emitting display device includes a display panel and a panel driver. The display panel includes a plurality of infrared pixels disposed in an infrared emission region, the infrared pixels emitting infrared light, and a plurality of display pixels disposed in a display region, the display pixels emitting visible light. The panel driver provides driving signals to the infrared pixels and the display pixels.

17 Claims, 11 Drawing Sheets

INTENSITY
APX
IPX
780
WAVELENGH(nm)

(51) Int. Cl.

| | |
|---|---|
| ***G06F 3/01*** | (2006.01) |
| ***G06K 9/00*** | (2006.01) |
| ***G09G 3/3266*** | (2016.01) |
| ***G09G 3/3275*** | (2016.01) |
| *G02B 27/00* | (2006.01) |
| *H04N 13/341* | (2018.01) |

(52) U.S. Cl.
CPC .................. *G02B 2027/014* (2013.01); *G02B 2027/0138* (2013.01); *G02B 2027/0178* (2013.01); *G02B 2027/0187* (2013.01); *G09G 2300/0426* (2013.01); *G09G 2330/023* (2013.01); *G09G 2354/00* (2013.01); *G09G 2360/145* (2013.01); *H04N 13/341* (2018.05)

(58) Field of Classification Search
CPC ..... G09G 2300/0426; G09G 2330/023; G09G 2354/00; G09G 2360/145; H04N 13/341
See application file for complete search history.

(56) References Cited

U.S. PATENT DOCUMENTS

2002/0140365 A1* 10/2002 Kobayashi ............... H01J 11/12 315/169.3
2004/0090411 A1* 5/2004 Lee ...................... G09G 3/3648 345/98
2004/0095168 A1* 5/2004 Miyazawa ............. G09G 3/325 327/108
2004/0252089 A1* 12/2004 Ono ..................... G09G 3/3233 345/82
2005/0110723 A1* 5/2005 Shin ..................... G09G 3/3233 345/76
2006/0125740 A1* 6/2006 Shirasaki ............... G09G 3/325 345/77
2006/0158397 A1* 7/2006 Goh ..................... G09G 3/3233 345/76
2007/0058467 A1* 3/2007 Tsuchiya .............. G09G 3/3696 365/205
2010/0020209 A1* 1/2010 Kim ....................... H04N 3/155 348/294
2010/0060551 A1* 3/2010 Sugiyama .............. G02B 26/06 345/8
2010/0133994 A1* 6/2010 Song ................... H01L 27/3211 313/504
2010/0253609 A1* 10/2010 Ono ..................... G09G 3/3233 345/76
2011/0175981 A1* 7/2011 Lai .................... H01L 27/14621 348/46
2011/0291116 A1* 12/2011 Kang ...................... H01L 51/56 257/88
2012/0081800 A1* 4/2012 Cheng .................... G03B 21/00 359/720
2012/0105310 A1* 5/2012 Sverdrup ............. G02B 27/017 345/8
2012/0113237 A1* 5/2012 Izawa .................... G09G 3/003 348/55
2012/0154277 A1* 6/2012 Bar-Zeev ............. G02B 27/017 345/158
2012/0182394 A1* 7/2012 Bae .................... H04N 13/0011 348/46
2013/0256638 A1* 10/2013 Uesugi ................ H01L 51/5228 257/40
2014/0145939 A1* 5/2014 Herold ................. G02B 27/017 345/156
2014/0293171 A1* 10/2014 Jun ........................ G02B 27/26 349/15
2014/0375540 A1* 12/2014 Ackerman ............. G06F 3/013 345/156
2015/0077312 A1* 3/2015 Wang ................... G02B 27/017 345/7
2015/0103098 A1* 4/2015 Sugden ................... G06F 3/147 345/633
2015/0179726 A1* 6/2015 Liu ..................... H01L 51/0089 257/40
2015/0324981 A1* 11/2015 Kim, II ................ A61N 5/0618 345/619
2015/0364107 A1* 12/2015 Sakariya ............... G06F 3/0412 345/174
2017/0115483 A1* 4/2017 Aleem ............... G02B 27/0093
2017/0285343 A1* 10/2017 Belenkii ............ G02B 27/0172
2018/0084232 A1* 3/2018 Belenkii ............ G02B 26/0833

* cited by examiner

110A
AR1
AR2
IR
AR1
AR2

ORGANIC LIGHT EMITTING DISPLAY DEVICE AND HEAD MOUNTED DISPLAY SYSTEM HAVING THE SAME

CROSS REFERENCE TO RELATED APPLICATION

This application claims priority under 35 U.S.C. § 119 to Korean patent Application No. 10-2016-0090145 filed on Jul. 15, 2016, the disclosure of which is hereby incorporated by reference herein in its entirety.

BACKGROUND

1. Technical Field

Example embodiments of the inventive concept relate to display devices. More particularly, example embodiments of the inventive concept relate to an organic light emitting display device and a head mounted display system having the organic light emitting display device.

2. Description of the Related Art

A head mounted display system may be mounted on a user's head, may enlarge an image (e.g., an image displayed on a display panel) using a lens, and may provide the image directed to the eyes of a user.

Generally, when a pixel density of a display panel is greater than 500 pixels per inch (PPI), the user may not perceive pixels in the normal display panel. However, the user could perceive pixels in the display panel of the head mounted display system because the head mounted display system provides the image to the user using the lens. Accordingly, a screen door effect or an artifact (e.g., a phenomenon that some single colors are visible to the user in a boundary of an object in the image) may occur. To resolve the above problem, the head mounted display system can perform a variety of image processing operations (e.g., a rendering processing in the boundary of the object in the image, etc.) to improve the display quality.

SUMMARY

Example embodiments provide a head mounted display system capable of reducing power consumption.

Example embodiments provide an organic light emitting display device for the head mounted display system.

According to some example embodiments, a head mounted display system may include an infrared sensor configured to generate an infrared image, an image processor configured to measure a position of a user pupil based on the infrared image and configured to generate image source based on the position of the user pupil, and an organic light emitting display device configured to display an image corresponding to the image source. The organic light emitting display device may include a display panel including a plurality of infrared pixels disposed in an infrared emission region, the infrared pixels configured to emit infrared light, and a plurality of display pixels disposed in a display region, the display pixels configured to emit visible light and a panel driver configured to provide driving signals to the infrared pixels and the display pixels.

In example embodiments, the display pixels may include red color pixels configured to emit red color light. A first emission layer included in each of the infrared pixels may include substantially a same material as a second emission layer included in each of the red color pixels.

In example embodiments, a thickness of the first emission layer may be greater than a thickness of the second emission layer.

In example embodiments, the infrared emission region may be adjacent to at least one side of the display region.

In example embodiments, the infrared emission region may surround the display region.

In example embodiments, the panel driver may generate the driving signals such that the display pixels are driven by a simultaneous emission manner. Each frame period of the simultaneous emission manner may include a non-emission period during which the display pixels do not emit the visible light and an emission period during which the display pixels simultaneously emit the visible light. The infrared pixels may emit the infrared light in at least a part of the non-emission period.

In example embodiments, the panel driver may include a scan driver configured to provide scan signals to the infrared pixels and the display pixels, a common control driver configured to provide a first common control signal for controlling a compensation operation of a threshold voltage of a driving transistor included in each of the display pixels and a second common control signal for controlling an emission operation of each of the display pixels to the display pixels, and a data driver configured to provide data signals to the infrared pixels and the display pixels.

In example embodiments, the data driver may provide the data signals that are substantially the same as each other to the infrared pixels.

In example embodiments, the data driver may provide, to the infrared pixels, the data signals that increase as a distance between a center of the display panel and each of the infrared pixels increases.

In example embodiments, the infrared sensor may include an infrared camera. The infrared camera may capture the infrared image in at least a part of the non-emission period.

In example embodiments, the image processor may generate the image source including a first portion and a second portion such that the first portion corresponding to the position of the user pupil has a first resolution and the second portion different from the first portion has a second resolution lower than the first resolution.

In example embodiments, a first pixel circuit included in each of the infrared pixels may have a different structure from a second pixel circuit included in each of the display pixels.

According to some example embodiments, an organic light emitting display device may include a display panel including a plurality of infrared pixels disposed in an infrared emission region, the infrared pixels configured to emit infrared light, and a plurality of display pixels disposed in a display region, the display pixels configured to emit visible light, and a panel driver configured to provide driving signals to the infrared pixels and the display pixels. The display pixels may include red color pixels configured to emit red color light. A first emission layer included in each of the infrared pixels may include substantially a same material as a second emission layer included in each of the red color pixels.

In example embodiments, a thickness of the first emission layer may be greater than a thickness of the second emission layer.

In example embodiments, the infrared emission region may be adjacent to at least one side of the display region.

In example embodiments, the infrared emission region may surround the display region.

According to some example embodiments, an organic light emitting display device may include a display panel including a plurality of infrared pixels disposed in an infrared emission region, the infrared pixels configured to emit infrared light, and a plurality of display pixels disposed in a display region, the display pixels configured to emit visible light, and a panel driver configured to provide driving signals to the infrared pixels and the display pixels such that the display pixels are driven by a simultaneous emission manner. Each frame period of the simultaneous emission manner may include a non-emission period during which the display pixels do not emit the visible light and an emission period during which the display pixels simultaneously emit the visible light. The infrared pixels may emit the infrared light in at least a part of the non-emission period.

In example embodiments, the panel driver may include a scan driver configured to provide scan signals to the infrared pixels and the display pixels, a common control driver configured to provide a first common control signal for controlling a compensation operation of a threshold voltage of a driving transistor included in each of the display pixels and a second common control signal for controlling an emission operation of each of the display pixels to the display pixels, and a data driver configured to provide data signals to the infrared pixels and the display pixels.

In example embodiments, the data driver may provide the data signals that are substantially the same as each other to the infrared pixels.

In example embodiments, the data driver may provide, to the infrared pixels, the data signals that increase as a distance between a center of the display panel and each of the infrared pixels increases.

Therefore, a head mounted display system according to example embodiments includes a display panel having infrared pixels for emitting infrared light as well as the display pixels for displaying an image, thereby tracking the position of user's pupil without additional infrared light source. Accordingly, because the size and weight of the head mounted display system can decrease, fatigue of the user's neck can be reduced. In addition, the head mounted display system can reduce the power consumption and improve performance of the rendering processing by setting the resolution of the image differently according to the position of the image based on the pupil position.

An organic light emitting display device according to example embodiments may control the scan driver and the data driver such that the display pixels are driven by a simultaneous emission manner and the infrared pixels emit the infrared light in at least a portion of non-emission period, thereby decreasing the complexity of the head mounted display system and reducing the manufacturing cost.

BRIEF DESCRIPTION OF THE DRAWINGS

Exemplary embodiments will be described more fully hereinafter with reference to the accompanying drawings, in which various embodiments are shown.

DESCRIPTION OF EMBODIMENTS

Exemplary embodiments will be described more fully hereinafter with reference to the accompanying drawings, in which various embodiments are shown.

Figure 1:
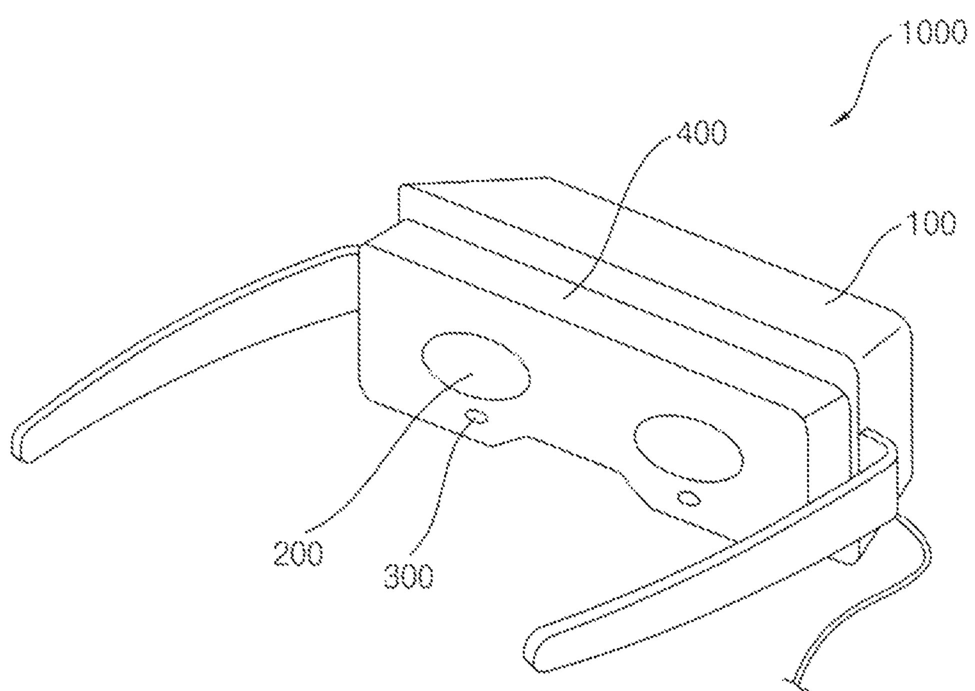
FIGS. 1 and 2 are diagrams illustrating a head mounted display system according to example embodiments.
Figure 2:
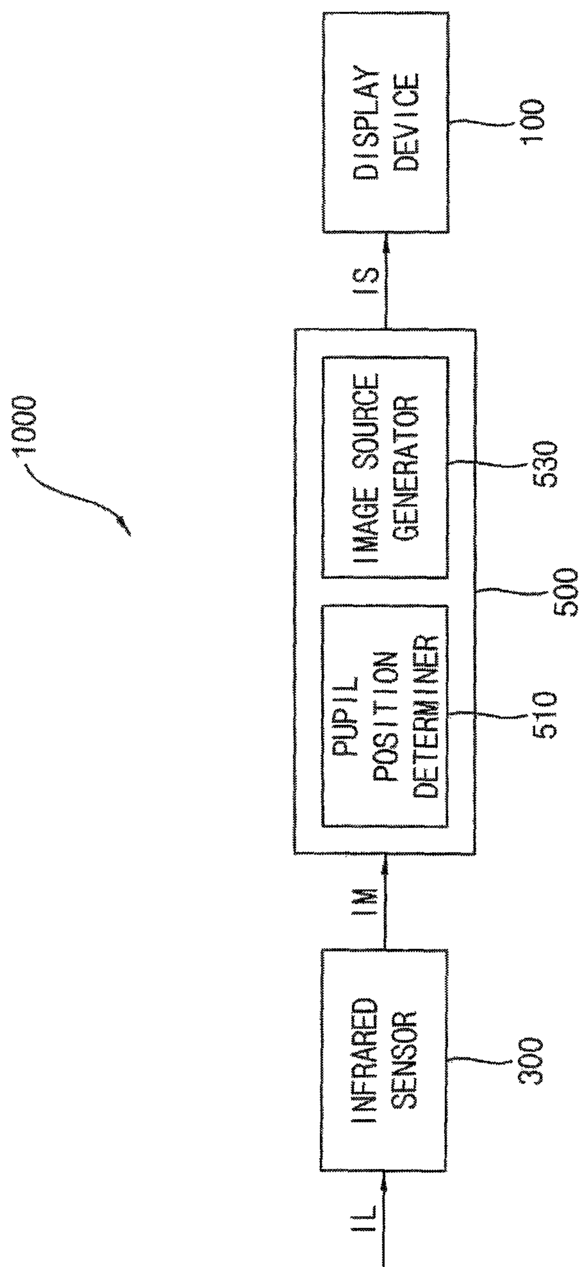

FIGS. 1 and 2 are diagrams illustrating a head mounted display system according to example embodiments.

Referring to FIGS. 1 and 2, the head mounted display system 1000 may include an organic light emitting display device 100, a lens 200, an infrared sensor 300, and an image processor 500.

The organic light emitting display device 100 may display an image corresponding to image source IS received from the image processor 500. The organic light emitting display device 100 may include a plurality of infrared pixels and a plurality of display pixels. The infrared pixels may be disposed in an infrared emission region of a display panel and may emit infrared light. The display pixels may be disposed in a display region of the display panel and may emit visible light. The organic light emitting display device 100 may be driven by a simultaneous emission manner and may be controlled such that the infrared pixels emit the infrared light in at least a part of the non-emission period during which the display pixels do not emit the visible light. Accordingly, the organic light emitting display device 100 may perform a role as infrared light source for tracking the position of user's pupil as well as displaying the image.

The infrared sensor 300 may generate an infrared image IM for a user's pupil using the infrared light IL emitted from the infrared pixels. In one example embodiment, the infrared sensor 300 may include an infrared camera attached to the edge of the lens 200. The infrared camera may generate the infrared image IM by capturing the user's pupil in at least a part of the non-emission period during which the display pixels do not emit the visible light and the infrared pixels emit the infrared light IL. In another example embodiment, the infrared sensor 300 may include a plurality of light receiving sensors attached to the edge of the lens 200, and then may generate the infrared image IM for deriving the position of the user pupil based on infrared light data received from the light receiving sensors.

The image processor 500 may include a pupil position determiner 510 determining the position of the user pupil based on the infrared image IM and an image source generator 530 generating the image source IS based on the position of the user pupil. For example, the image processor 500 may be located inside of a housing 400. In one example embodiment, the image processor 500 may generate the image source IS having a first portion corresponding to the position of the user pupil and a second portion different from the first portion. The first portion may have a first resolution, and the second portion may have a second resolution lower than the first resolution. Thus, the image processor 500 may perform a foveated rendering operation in which a portion actually observed by the user is processed at a relatively high resolution and other regions are processed at a relatively low resolution by tracking the user's pupil. Accordingly, because the user can perceive images to be of high display quality without processing the entire image in high resolution, the load of the image processor 500 can be lowered, the performance of the rendering processing can be improved, and the power consumption can be reduced.

The lens 200 can directly transfer an image displayed on the display device 100 to the user's eyes when the head mounted display system 1000 is worn by the user. For example, the lens 200 may be an eyepiece. The display device 100 and the lens 200 can be spaced apart with a predetermined distance.

The head mounted display system 1000 may further include a housing 400 for being worn on the user's head and supporting the display device 100 and the lens 200. The head mounted display system 1000 may further include lens, reflectors, optical elements, and the like for forming or adjusting an optical path in order that an image displayed on the display device 100 is provided to the user's eyes.

Figure 3:
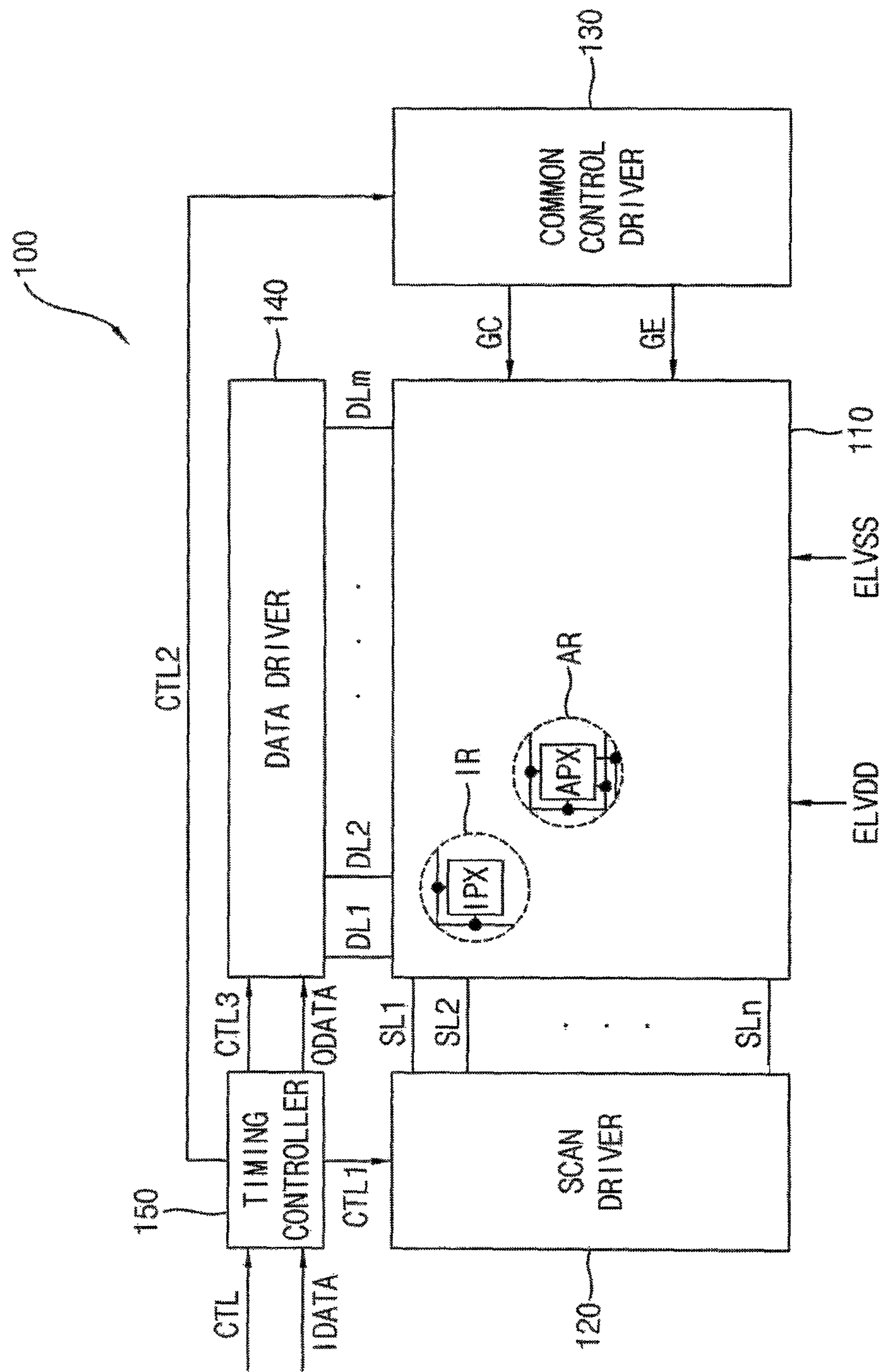
FIG. 3 is a block diagram illustrating an example of an organic light emitting display device included in the head mounted display system of FIG. 1.
Figure 4:
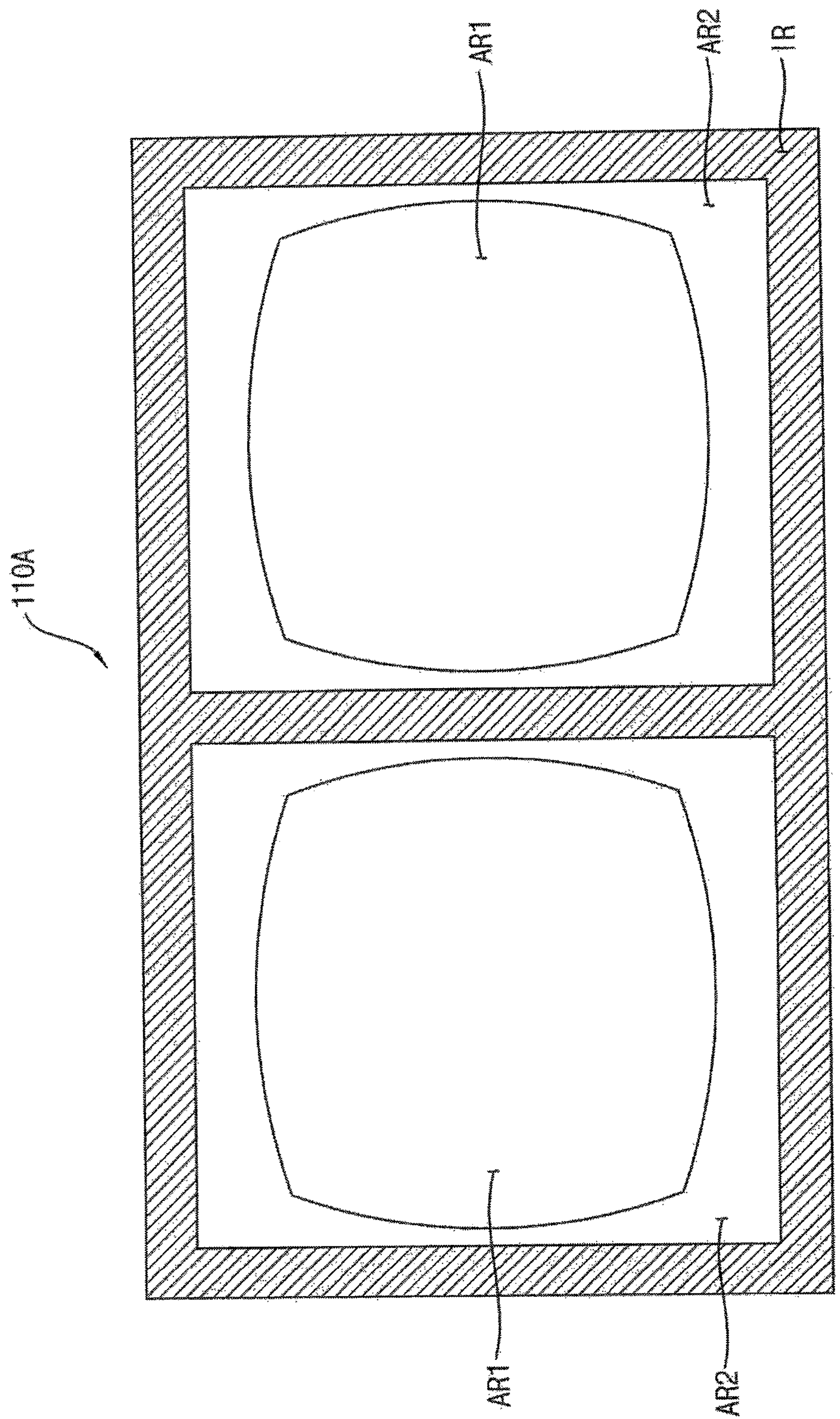
FIG. 4 is a diagram illustrating one example of a display panel included in the organic light emitting display device of FIG. 3.

FIG. 3 is a block diagram illustrating an example of an organic light emitting display device included in the head mounted display system of FIG. 1. FIG. 4 is a diagram illustrating one example of a display panel included in the organic light emitting display device of FIG. 3.

Referring to FIGS. 3 and 4, the organic light emitting display device may include a display panel 110 and a panel driver. The panel driver may include a scan driver 120, a common control driver 130, a data driver 140, and a timing controller 150.

The display panel 110 may be divided into a display region AR1, AR2, and an infrared emission region IR. For example, as shown in FIG. 4, the display panel 110 may include a first display region AR1 on which a left image provided to a left eye of the user and a right image provided to a right eye of the user are displayed and a second display region AR2 on which a black image is displayed outside of the first display region AR1. The first display region AR1 and the second display region AR2 may include a plurality of display pixels APX emitting the visible light to display the left image, the right image and the black image. The infrared emission region IR may surround the display region AR1, AR2 and may include a plurality of infrared pixels IPX emitting the infrared light. The infrared pixels IPX may perform a role as the infrared light source. The infrared light emitted from infrared pixels IPX may reach the user's pupil through the lens, and then the infrared sensor may capture the infrared image for the user's pupil.

The scan driver 120 may provide scan signals to the infrared pixels IPX and the display pixels APX via the scan lines SL1 through SLn based on the first control signal CTL1.

The common control driver 130 may provide a first common control signal GC and a second common control signal GE to the display pixels APX based on a second control signal CTL2. The first common control signal GC is for controlling a compensation operation of a threshold voltage of a driving transistor included in each of the display pixels APX. The second common control signal GE is for controlling an emission operation of each of the display pixels APX. Accordingly, the display pixel APX may be driven by a simultaneous emission manner.

The data driver 140 may receive a third control signal CTL3 and output image data ODATA. The data driver 140 may convert the output image data ODATA into analog type data signals based on the third control signal CTL3, and then may provide the converted data signals to the infrared pixels IPX and the display pixels APX via the data lines DL1 through DLm. In one example embodiment, the data driver 140 may provide the same data signal to each of the infrared pixels IPX. For example, the data driver 140 may provide the data signal corresponding to a maximum grayscale value to each of the infrared pixels IPX to increase the intensity of infrared light emitted from the infrared pixels IPX and reduce a failure of the user's pupil tracking. In another example embodiment, the data driver 140 may provide data signals to the infrared pixels IPX that increase as a distance between a center of the display panel 110 and each of the infrared pixels IPX increases. Thus, the data driver 140 may provide the data signal to an infrared pixel IPX based on the distance between the center of the display panel and the infrared pixel IPX or the distance between user's pupil and the infrared pixel IPX. Accordingly, user's pupil can receive the infrared light with substantially equal intensity in all direction.

The timing controller 150 may control the scan driver 120, the common control driver 130, and the data driver 140. The timing controller 150 may receive input image data IDATA and a control signal CTL from an external device such as a system board. The timing controller 150 may generate first through third control signals CTL1 through CTL3 to control the scan driver 120, the common control driver 130, and the data driver 140. For example, the first control signal CTL1 for controlling the scan driver 120 may include a vertical start signal, a scan clock signal, etc. The second control signal CTL2 for controlling the common control driver 130 may include a synchronous signal, etc. The third control signal CTL3 for controlling the data driver 140 may include a horizontal start signal, a load signal, etc. The timing controller 150 may generate digital type output image data ODATA matching the operation condition of the display panel 110 based on the input image data IDATA, and then provide the output image data ODATA to the data driver 140.

Although the example embodiments of FIG. 4 describe that the black image is displayed on the second display region AR2, the additional images for configurations (e.g., configurations of display device or lens for the optical path adjustment) can be displayed on the second display region AR2.

Figure 5A:
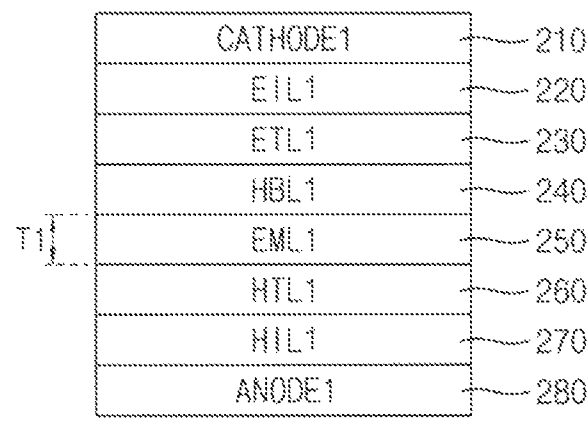
FIG. 5A is a diagram illustrating an example of an organic light emitting diode of a display pixel included in the display panel of FIG. 4.
Figure 5B:
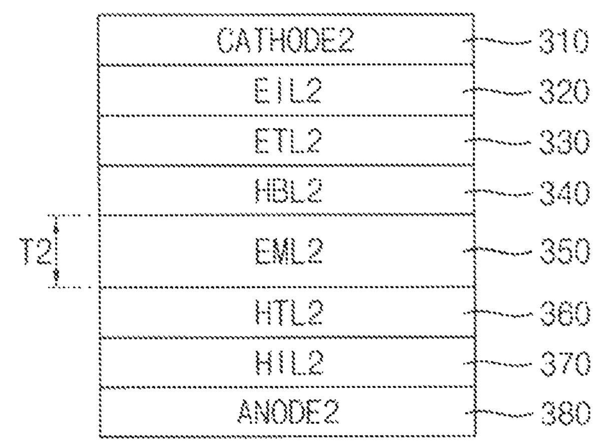
FIG. 5B is a diagram illustrating an example of an organic light emitting diode of an infrared pixel included in the display panel of FIG. 4.
Figure 6:
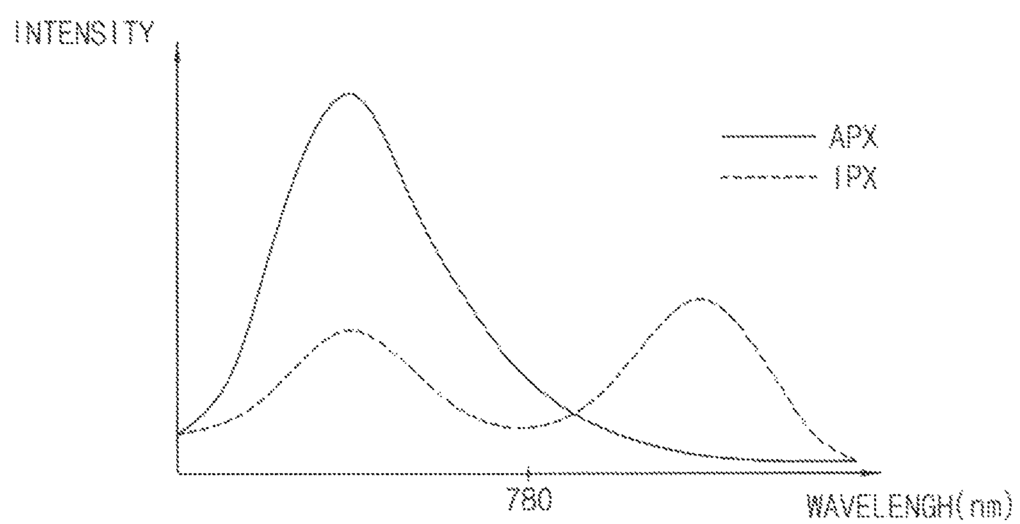
FIG. 6 is a graph for describing a relationship between wavelength and intensity in the display pixel and the infrared pixel included in the display panel of FIG. 4.

FIG. 5A is a diagram illustrating an example of an organic light emitting diode of a display pixel included in the display panel of FIG. 4. FIG. 5B is a diagram illustrating an example of an organic light emitting diode of an infrared pixel included in the display panel of FIG. 4. FIG. 6 is a graph for describing a relationship between wavelength and intensity in the display pixel and the infrared pixel included in the display panel of FIG. 4.

Referring to FIGS. 5A, 5B, and 6, the infrared pixel may include substantially a same material as a red color pixel emitting the red color light among the display panels. An organic light emitting diode (OLED) in the infrared pixel may have a same structure as an OLED in the red color pixel. Generally, a wavelength of light emitted from an emission layer may increase as a distance between two electrodes (i.e., an anode and a cathode) of the OLED increases. Therefore, the infrared pixel can be formed without additional processing cost by adjusting a thickness of the emission layer included in the infrared pixel or adjusting the distance between two electrodes such that the infrared pixel emits the infrared light.

As shown in FIG. 5A, the OLED included in the red color pixel may include a cathode electrode 210 and an anode electrode 280. The OLED included in the red color pixel may also include an electron injection layer (EIL1) 220, an electron transport layer (ETL1) 230, a hole blocking layer (HBL1) 240, an emission layer (EML1) 250, a hole transport layer (HTL1) 260, and a hole injection layer (HIL1) 270 between the cathode electrode 210 and the anode electrode 280.

The cathode electrode 210 may provide electrons to the emission layer 250 via the electron injection layer 220 and the electron transport layer 230. The anode electrode 280 may provide holes to the emission layer 250 via the hole injection layer 270 and the hole transport layer 260. The hole blocking layer 240 may be located between the emission layer 250 and the electron transport layer 230 and may include materials having good electron-transporting and low hole-transporting characteristics. The emission layer 250 may include an organic light emitting host material and organic light emitting dopant materials doped to the organic luminescent host material.

In one example embodiment, an OLED of the infrared pixel may have a same structure as an OLED of the red color pixel. As shown in FIG. 5B, the OLED of the infrared pixel may include a cathode electrode 310 and an anode electrode 380, and may also include an electron injection layer (EIL2) 320, an electron transport layer (ETL2) 330, a hole blocking layer (HBL2) 340, an emission layer (EML2) 350, a hole transport layer (HTL2) 360, and hole injection layer (HIL2) 370 between the cathode electrode 310 and the anode electrode 380. The emission layer 350 of the infrared pixel may include the same emission material (i.e., host material and dopant material) as the emission layer 250 of the display pixel and may have a thickness for emitting the infrared light. In one example embodiment, a second thickness T2 of the emission layer 350 of the infrared pixel may be greater than a first thickness of the emission layer 250 of the red color pixel. For example, the emission layer 350 of the infrared pixel may be patterned with the second thickness T2 different from the first thickness T1 of the emission layer 250 of the red color pixel by a nozzle printing process, an ink-jet printing process, etc.

As shown in FIG. 6, light emitted from the red color pixel APX may have a peak intensity in a wavelength range corresponding to the red color visible light (e.g., 620 nm to 780 nm). On the other hand, light emitted from the infrared pixel IPX may have a peak intensity in a wavelength range corresponding to the infrared light (e.g., 780 nm to 1,000 nm). The thickness of the emission layer in the infrared pixel IPX can be determined such that intensity of the visible light is minimized so as not to be perceived by the user and intensity of the infrared light is maximized so as to increase the reliability of user's pupil tracking.

Although the example embodiments of FIGS. 5A and 5B describe that the OLEDs in the display pixel or the infrared pixel include the cathode electrode, the electron injection layer, the electron transport layer, the hole blocking layer, the emission layer, the hole transport layer, the hole injection layer, and the anode electrode, a structure of the OLED is not limited thereto. For example, the OLED may optionally include one or more of the electron injection layer, the electron transport layer, the hole blocking layer, the hole transport layer, and the hole injection layer.

Although the example embodiments of FIGS. 5A and 5B describe that the OLED in display pixel and the OLED in the infrared pixel have the same structure, the OLED in the infrared pixel may have a different structure from the OLED in the display pixel. For example, the OLED in the infrared pixel may further include a resonance layer to enhance the resonance effect.

Although the example embodiments of FIGS. 5A and 5B describe that the infrared pixel has the emission layer of which thickness differs from a thickness of the emission layer in the red color pixel such that the infrared pixel emits the infrared light, the example embodiments are not limited thereto. For example, the OLED in the infrared pixel may have a different thickness from the OLED in the display pixel by adjusting a thickness of at least one of the cathode electrode, the electron injection layer, the electron transport layer, the hole blocking layer, the hole transport layer, the hole injection layer, and the anode electrode in order to adjust the distance between the anode electrode and the cathode electrode of the OLED.

Figure 7:
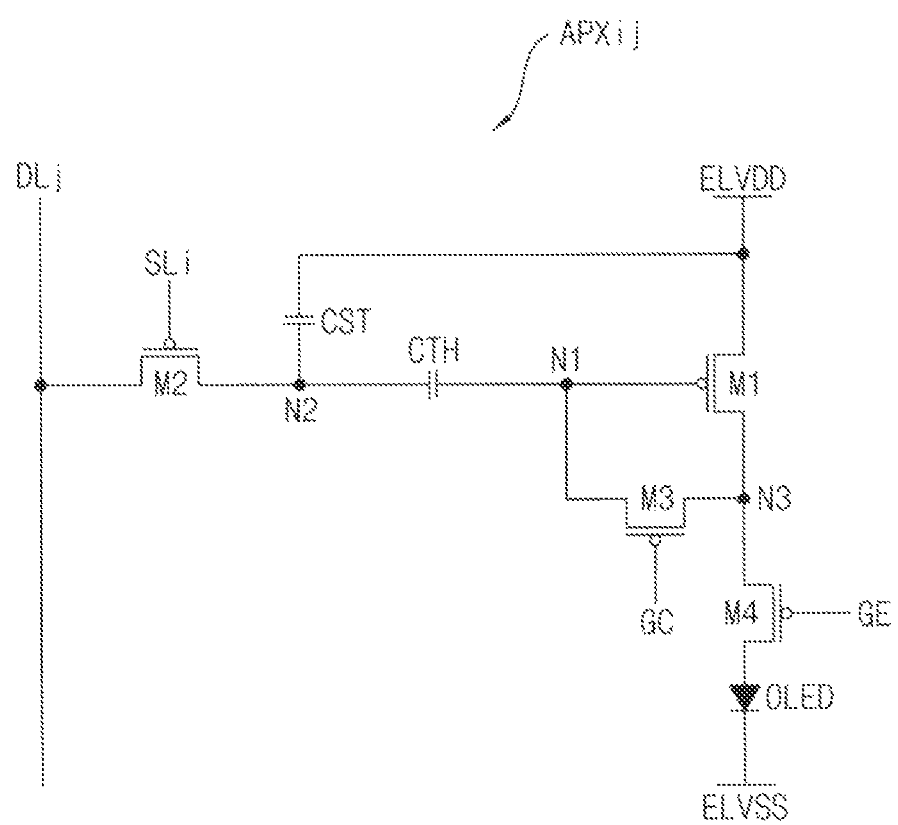
FIG. 7 is a circuit diagram illustrating an example of the display pixel included in the display panel of FIG. 4.
Figure 8:
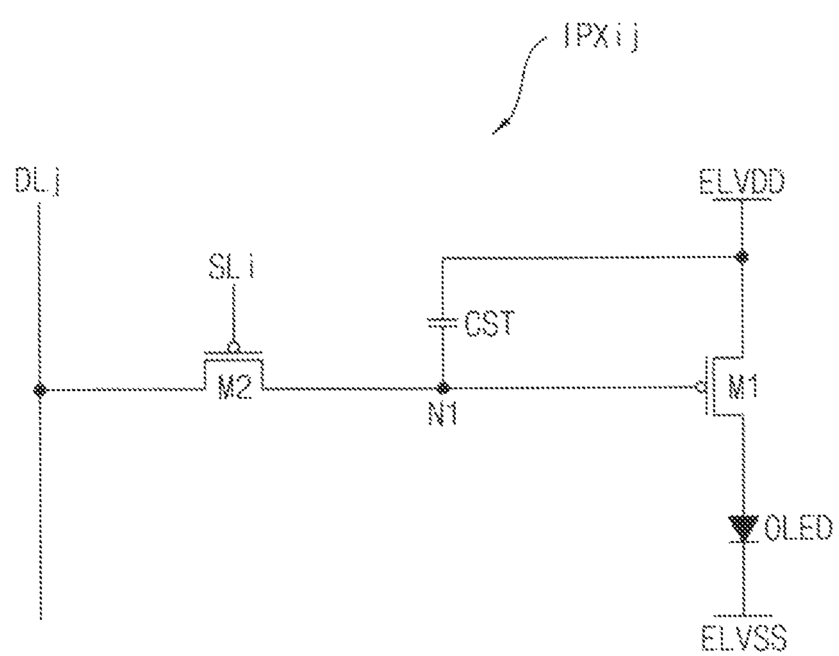
FIG. 8 is a circuit diagram illustrating an example of the infrared pixel included in the display panel of FIG. 4.
Figure 9:
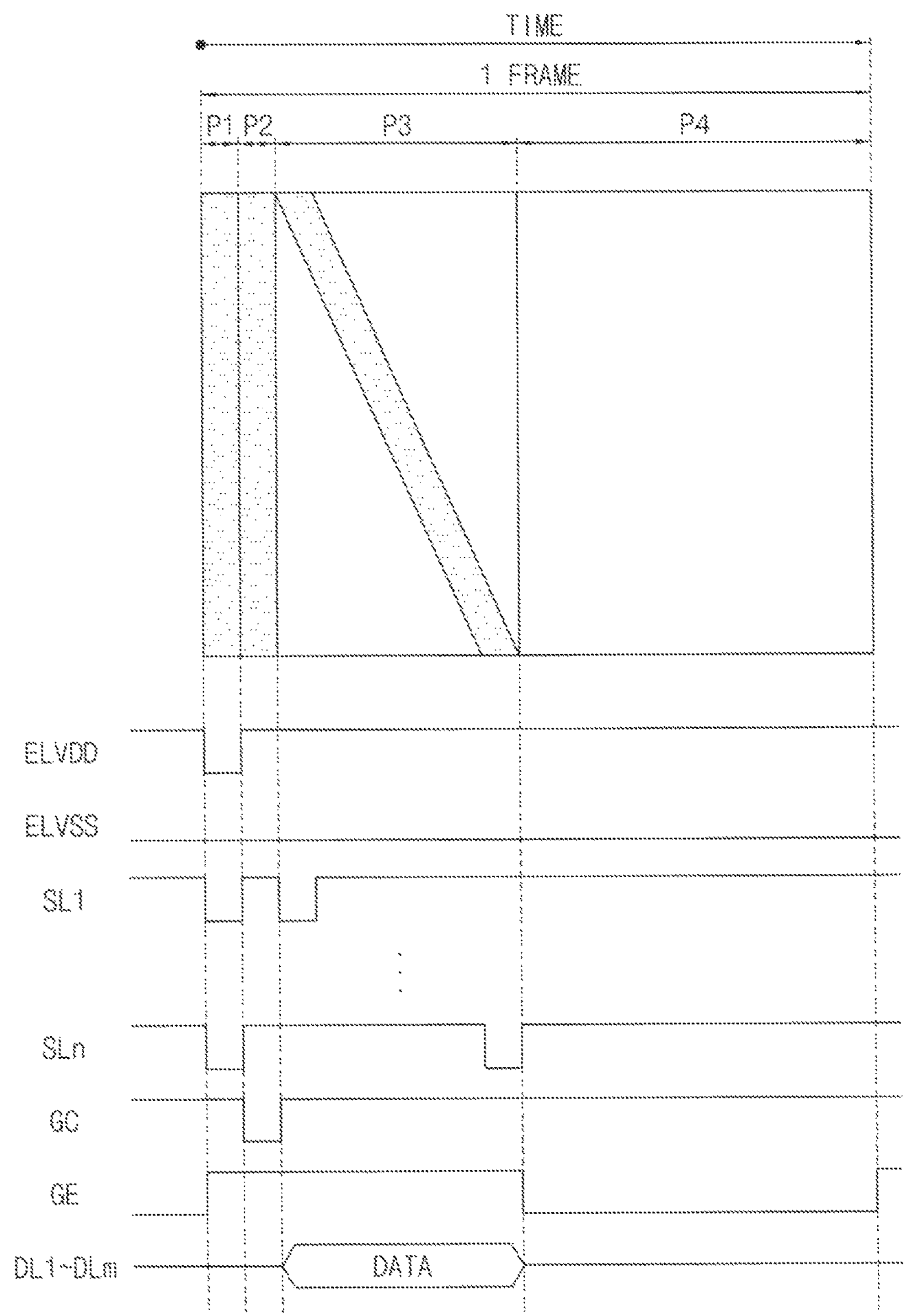
FIG. 9 is a diagram for describing operations of the display pixel and the infrared pixel included in the display panel of FIG. 4.

FIG. 7 is a circuit diagram illustrating an example of the display pixel included in the display panel of FIG. 4. FIG. 8 is a circuit diagram illustrating an example of the infrared pixel included in the display panel of FIG. 4. FIG. 9 is a diagram for describing operations of the display pixel and the infrared pixel included in the display panel of FIG. 4.

Referring to FIGS. 7 through 9, each of the display pixels may include a pixel circuit to be driven by a simultaneous emission manner so as to display an image corresponding to image source. The infrared pixel may include a pixel circuit for emitting the infrared light in at least a portion of the non-emission period during which the display pixels do not emit the visible light. Accordingly, the infrared sensor may capture the infrared image in the non-emission period, thereby tracking the position of the user pupil.

As shown in FIG. 7, the display pixel APXij may include first through fourth transistors M1 through M4, a storage capacitor CST, a compensation capacitor CTH, and an OLED.

The first transistor M1 may be a driving transistor. The first transistor M1 may include a gate electrode connected to a first node N1, a first electrode receiving a first power voltage ELVDD, and a second electrode connected to a third node N3.

The second transistor M2 may include a gate electrode connected to a scan line SLi, a first electrode connected to the data line DLj, and a second electrode connected to a second node N2.

The third transistor M3 may include a gate electrode receiving a first common control signal GC, a first electrode connected to the first electrode N1, and a second electrode connected to the third node N3. The third transistor M3 may connect the gate electrode of the first transistor M1 to the second electrode of the first transistor M1 (i.e., forming a diode connection for the driving transistor) in response to the first common control signal GC.

The fourth transistor M4 may include a gate electrode receiving a second common control signal GE, a first electrode connected to the third node N3, and a second electrode connected to an anode electrode of OLED. The fourth transistor M4 may pass a driving current that corresponds to a data signal and is transmitted from the driving transistor on to the anode electrode of OLED in response to the second common control signal GE.

The storage capacitor CST may include a first electrode connected to the second node N2 and a second electrode connected to the first electrode of the first transistor M1. The storage capacitor CST may store and maintain a voltage according to a difference between the first electrode and the second electrode. Therefore, the storage capacitor CST may store a voltage (e.g., a voltage value) according to the amount of change of voltages applied to the second node N2. The compensation capacitor CTH may include a first electrode connected to the second node N2 and a second electrode connected a first node N1.

The OLED may include the anode electrode connected to the second electrode of the fourth transistor M4 and a cathode electrode connected to a second power voltage ELVSS. The OLED may emit light corresponding to a magnitude of the driving transistor.

As shown in FIG. 8, the infrared pixel IPXij may include first and second transistors M1 and M2, a storage capacitor CST, and an OLED.

The first transistor M1 may be a driving transistor. The first transistor M1 may include a gate electrode connected to the first node N1, a first electrode receiving the first power voltage, and a second electrode connected to the anode electrode of the OLED.

The second electrode M2 may include gate electrode connected to a scan line SLi, a first electrode connected to a data line DLj, and a second electrode connected to the first node N1. The second transistor M2 may provide the data signal to the gate electrode of the first transistor M1 in response to the scan signal.

The capacitor CST may include a first electrode connected to the first node and a second electrode connected to the first electrode of the first transistor M1. The capacitor CST may charge the data signal applied to the gate electrode of the first transistor M1 and may maintain the charged voltage after the second transistor M2 is turned-off.

The OLED may include the anode electrode connected to the second electrode of the first transistor M1 and a cathode electrode connected to the second power voltage ELVSS. The OLED may emit the infrared light corresponding to a magnitude of the driving transistor.

As shown in FIG. 9, a single frame period of the simultaneous emission manner may include a non-emission period during which the display pixels do not emit the visible light and an emission period P4 during which the display pixels simultaneously emit the visible light. The non-emission period may include a reset period Pl, a compensation period P2, and a scan period P3.

During the reset period P1, each of the display pixels may receive a scan signal having a low level for turning the second transistor on and a data signal set to a predetermined reference voltage (i.e., a reset voltage). Accordingly, the gate electrode of the driving transistor of the display pixel may be set to the reset voltage. In this time, the second common control signal GE may be a high level for turning the fourth transistor M4 off. Accordingly, the current path of the OLED can be blocked.

During the compensation period P2, each of the display pixels may receive a first common control signal GC having a low level for turning the third transistor M3 on, and then driving transistors of all display pixels may form a diode connection. Accordingly, the threshold voltage of the driving transistor of each pixel may be compensated to improve luminance unevenness occurring by a deviation of the threshold voltage of the driving transistor.

During the scan period P3, the scan signal having the low level may be progressively outputted to the scan lines SL1 through SLn. A data signal for displaying an image may be programmed in the display pixels in response to the scan signal having the low level. Also, a data signal (e.g., a maximum data signal) for emitting the infrared light may be programmed in the infrared pixels in response to the scan signal having the low level. In this time, the display pixels may receive the second common control signal GE having high level, and then the fourth transistors M4 included in all display pixels may be turned off. Therefore, all of the display pixels may not emit light. On the other hand, the driving current corresponding to the data signal programmed in the infrared pixels may flow through OLEDs in the infrared pixels, and then the infrared pixels may emit the infrared light in the scan period P3.

During the emission period P4, the display pixels may receive the second common control signal GE having low level, and then the fourth transistors M4 in all of the display pixels may be turned-on. The driving current corresponding to the data signal programmed in the display pixels may flow through OLEDs in the display pixels. Therefore, OLEDs in the all of the display pixels may emit the light.

Although the example embodiments of FIGS. 7 through 9 describe that the display pixel includes the first through fourth transistors, the storage capacitor, and the OLED, and the infrared pixel includes the first and second transistors, the storage capacitor, and the OLED, the display pixel and the infrared pixel can be implemented by various structures capable that the display pixel can be driven by the simultaneous emission manner and the infrared pixel can emit the infrared light in at least a part of the non-emission period.

Figure 10:
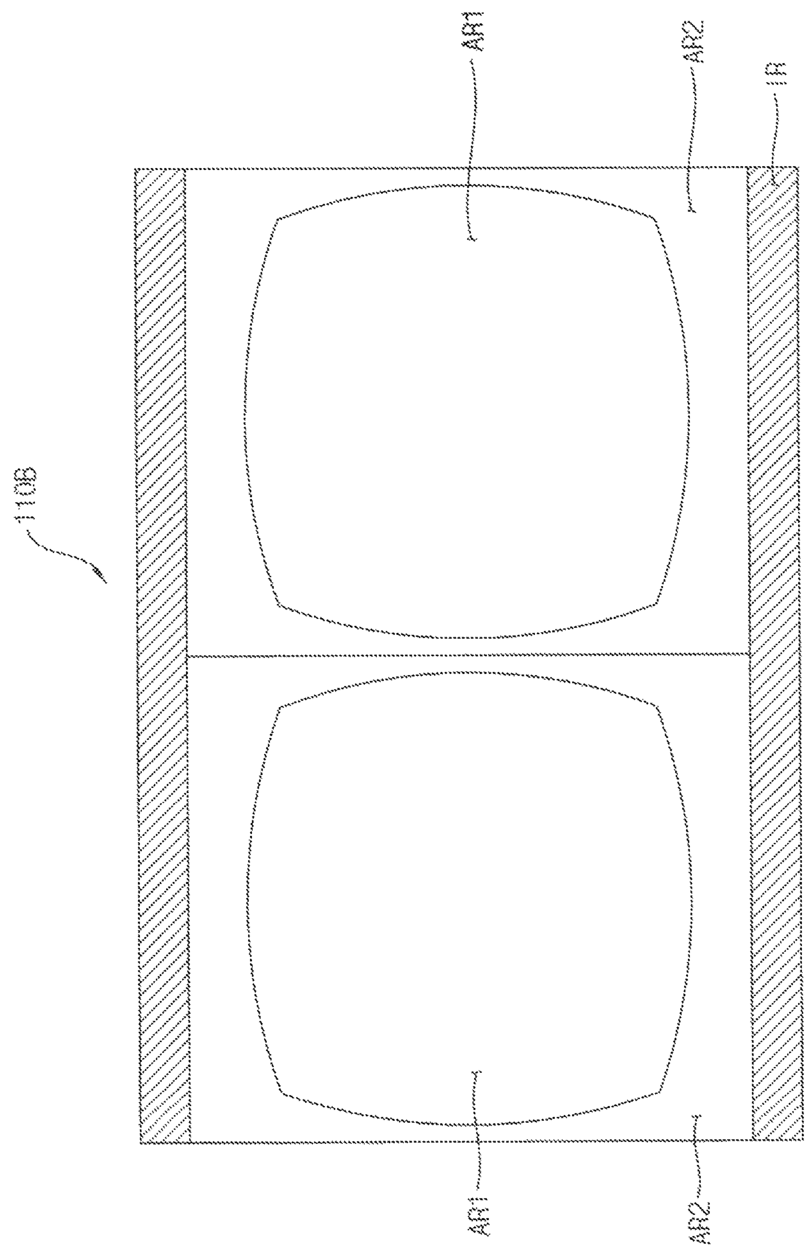
FIG. 10 is a diagram illustrating another example of a display panel included in the organic light emitting display device of FIG. 3.

FIG. 10 is a diagram illustrating another example of a display panel included in the organic light emitting display device of FIG. 3.

Referring to FIG. 10, the display panel 110B may be divided into a display region AR1, AR2 and an infrared emission region IR. A plurality of display pixels emitting visible light may be disposed on the display region AR1, AR2. A plurality of infrared pixels emitting infrared light may be disposed on the infrared emission region IR. In one example embodiment, the infrared emission region IR may be adjacent to at least one side of the display region AR1, AR2. For example, the display panel 110B may divided into a first display region AR1 on which left image and right image are displayed, a second display region AR2 on which a black image is displayed and surrounding the first display region AR1, and the infrared emission region IR adjacent to top and bottom sides of the second display region AR2.

Although the example embodiments of FIGS. 4 through 10 describe that the infrared emission region is located outside the display region, the infrared emission region can be inserted in the display region. For example, display pixel rows composed of the display pixels and infrared pixel rows composed of the infrared pixels can be alternatively disposed.

Figure 11:
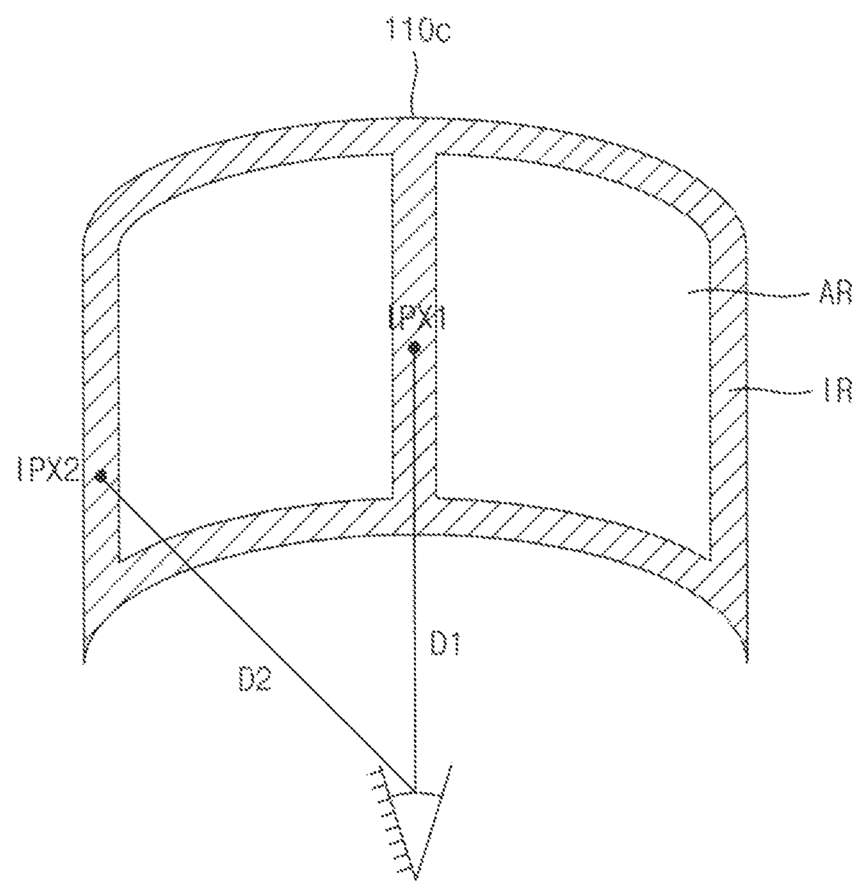
FIG. 11 is a diagram for describing of a shape the display panel included in the organic light emitting display device of FIG. 3.

FIG. 11 is a diagram for describing of a shape the display panel included in the organic light emitting display device of FIG. 3.

Referring to FIG. 11, the display panel 110C may be a flexible display panel or a curved display panel. In one example embodiment, the curvature of the display panel 110C may be adjusted such that the distances between each pixel (display pixel or infrared pixel) and user's eyes (or lens) are substantially the same. For example, depending on the mounted state (i.e., how the head mounted display system is mounted on the user's head), the curvature of the display panel 110C may be adjusted such that a first distance D1 between a first infrared pixel IPX1 located on the center of the display panel 110C and user's eye is substantially the same as a second distance D2 between a second infrared pixel IPX2 located on the boundary portion of the display panel 110C and user's eye. Therefore, intensity of the infrared light reaching the user's eye may increase because the distance between the infrared pixel and user's eye decreases.

Although an organic light emitting display device and a head mounted display system having the organic light emitting display device according to example embodiments have been described with reference to figures, those skilled in the art will readily appreciate that many modifications are possible in the example embodiments without materially departing from the novel teachings and advantages of the present inventive concept.

The present inventive concept may be applied to an electronic device having the organic light emitting display device. For example, the present inventive concept may be applied to cellular phone, a smart phone, a smart pad, a virtual reality device, a game machine, etc interlocked with the head mounted display system.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A head mounted display system comprising:

an infrared sensor configured to generate an infrared image;

an image processor configured to measure a position of a user pupil based on the infrared image and configured to generate image source based on the position of the user pupil; and an organic light emitting display device configured to display an image corresponding to the image source, wherein the organic light emitting display device includes:

a display panel including a plurality of infrared pixels disposed in an infrared emission region, the infrared pixels configured to emit infrared light, and a plurality of display pixels disposed in a display region, the display pixels configured to emit visible light; and a panel driver configured to provide driving signals to the infrared pixels and the display pixels, and wherein the display pixels includes red color pixels configured to emit red color light, wherein a first emission layer included in each of the infrared pixels includes substantially a same material as a second emission layer included in each of the red color pixels, and wherein a thickness of the first emission layer is greater than a thickness of the second emission layer.

2. The head mounted display system of claim 1, wherein the infrared emission region is adjacent to at least one side of the display region.

3. The head mounted display system of claim 1, wherein the infrared emission region surrounds the display region.

4. The head mounted display system of claim 1, wherein the image processor generates the image source including a first portion and a second portion such that the first portion corresponding to the position of the user pupil has a first resolution and the second portion different from the first portion has a second resolution lower than the first resolution.

5. The head mounted display system of claim 1, wherein a first pixel circuit included in each of the infrared pixels has a different structure from a second pixel circuit included in each of the display pixels.

6. The head mounted display system of claim 1, wherein the panel driver generates the driving signals such that the display pixels are driven by a simultaneous emission manner, wherein each frame period of the simultaneous emission manner includes a non-emission period during which the display pixels do not emit the visible light and an emission period during which the display pixels simultaneously emit the visible light, and wherein the infrared pixels emit the infrared light in at least a part of the non-emission period.

7. The head mounted display system of claim 6, wherein the infrared sensor includes an infrared camera, and wherein the infrared camera captures the infrared image in at least a part of the non-emission period.

8. The head mounted display system of claim 6, wherein the panel driver includes:

a scan driver configured to provide scan signals to the infrared pixels and the display pixels;

a common control driver configured to provide a first common control signal for controlling a compensation operation of a threshold voltage of a driving transistor included in each of the display pixels and a second common control signal for controlling an emission operation of each of the display pixels to the display pixels; and a data driver configured to provide data signals to the infrared pixels and the display pixels.

9. The head mounted display system of claim 8, wherein the data driver provides the data signals that are substantially the same as each other to the infrared pixels.

10. The head mounted display system of claim 8, wherein the data driver provides, to the infrared pixels, the data signals that increase as a distance between a center of the display panel and each of the infrared pixels increases.

11. An organic light emitting display device comprising:

a display panel including a plurality of infrared pixels disposed in an infrared emission region, the infrared pixels configured to emit infrared light, and a plurality of display pixels disposed in a display region, the display pixels configured to emit visible light; and a panel driver configured to provide driving signals to the infrared pixels and the display pixels, wherein the display pixels includes red color pixels configured to emit red color light, and wherein a first emission layer included in each of the infrared pixels includes substantially a same material as a second emission layer included in each of the red color pixels, and wherein a thickness of the first emission layer is greater than a thickness of the second emission layer.

12. The display device of claim 11, wherein the infrared emission region is adjacent to at least one side of the display region.

13. The display device of claim 11, wherein the infrared emission region surrounds the display region.

14. An organic light emitting display device comprising:

a display panel including a plurality of infrared pixels disposed in an infrared emission region, the infrared pixels configured to emit infrared light, and a plurality of display pixels disposed in a display region, the display pixels configured to emit visible light; and a panel driver configured to provide driving signals to the infrared pixels and the display pixels such that the display pixels are driven by a simultaneous emission manner, wherein each frame period of the simultaneous emission manner includes a non-emission period during which the display pixels do not emit the visible light and an emission period during which the display pixels simultaneously emit the visible light, and wherein the infrared pixels emit the infrared light in at least a part of the non-emission period.

15. The display device of claim 14, wherein the panel driver includes:

a scan driver configured to provide scan signals to the infrared pixels and the display pixels;

a common control driver configured to provide a first common control signal for controlling a compensation operation of a threshold voltage of a driving transistor included in each of the display pixels and a second common control signal for controlling an emission operation of each of the display pixels to the display pixels; and a data driver configured to provide data signals to the infrared pixels and the display pixels.

16. The display device of claim 15, wherein the data driver provides the data signals that are substantially the same as each other to the infrared pixels.

17. The display device of claim 15, wherein the data driver provides, to the infrared pixels, the data signals that increase as a distance between a center of the display panel and each of the infrared pixels increases.

* * * * *